United States Patent [19]

Oakley et al.

[11] Patent Number: 5,350,098
[45] Date of Patent: Sep. 27, 1994

[54] SEVERING A WORKPIECE BY SCORING AND BREAKING THEREOF

[75] Inventors: Gary A. Oakley, Denver; David Chrisp, Littleton, both of Colo.

[73] Assignee: Oakley Industries, Incorporated, Englewood, Colo.

[21] Appl. No.: 966,096

[22] Filed: Oct. 22, 1992

[51] Int. Cl.⁵ ............................................. B26F 3/00
[52] U.S. Cl. ...................................... 225/2; 225/96.5
[58] Field of Search ....................... 225/2, 96.5; 83/176

[56] References Cited

U.S. PATENT DOCUMENTS

| | | | |
|---|---|---|---|
| 3,138,308 | 6/1964 | Oakley | 225/96.5 X |
| 3,268,137 | 8/1966 | Martin | 225/96.5 X |
| 3,613,489 | 10/1971 | Randich | 82/70.2 |
| 3,659,764 | 5/1972 | Janiszewski | 225/96.5 X |
| 3,739,666 | 6/1973 | Wright et al. | 82/59 |
| 3,978,747 | 9/1976 | Lyon | 83/18 |
| 4,567,795 | 2/1986 | Pool | 83/17 |
| 4,633,695 | 1/1987 | Klein | 72/70 |

FOREIGN PATENT DOCUMENTS

| | | | |
|---|---|---|---|
| 313620 | 12/1971 | U.S.S.R. | 225/96.5 |
| 703256 | 12/1979 | U.S.S.R. | 225/96.5 |

Primary Examiner—Eugenia Jones
Assistant Examiner—Raymond D. Woods
Attorney, Agent, or Firm—Sheridan, Ross & McIntosh

[57] ABSTRACT

A workpiece severing apparatus includes rotatable cutting and breaking assemblies that move about a fixedly held workpiece. At the same time a cutting edge of the cutting assembly is moving through the workpiece by cutting the workpiece along its entire periphery, rollers of the breaking assembly are applying a desired force to workpiece portions. Movement of the rollers relative to the workpiece is controlled so that tension is always applied to the workpiece in a way that facilitates cutting. The cutting assembly stops its cutting operation when a predetermined thickness of the workpiece remains. After this occurs, the two assemblies continue to rotate and the breaking assembly eventually causes a severed workpiece portion to be separated from a held workpiece portion.

35 Claims, 7 Drawing Sheets

SEVERING A WORKPIECE BY SCORING AND BREAKING THEREOF

FIELD OF THE INVENTION

The present invention relates to cutting a workpiece and, in particular, cutting a length of tubing or the like by scoring the entire periphery thereof while breaking or bending the same during the scoring operation.

BACKGROUND OF THE INVENTION

The severing of pipes or tubes of various sizes to achieve a desired length thereof has been widely practiced by a variety of means and methods. Major problems faced by any severing technique involve the unwanted formation of burrs and/or tube deformations adjacent the severed end. Both of these results are unacceptable to achieving a uniform severed product. Any such burr has to be removed by one or more additional manufacturing steps, which adds to the time and expense of the severing operation. Similarly, a deformed end typically means that the hollow portion at the end of the severed tube must be reamed to provide a hollow portion at the end of the severed tube that is uniform with the remaining inside portions of the tube.

A number of different mechanisms have been advanced for severing tubes while still providing a uniform cut. In U.S. Pat. No. 3,613,489 to Randich, issued Oct. 19, 1971 and entitled "Method and Apparatus for Severing Tubes," the severing of tubes and pipes is accomplished by scoring the entire circumference of the fixedly held pipe or tube. The avoidance of burrs is purportedly achieved by clamping the tube in a manner that exerts a tensile stress in a direction along the axis of the tube. This patent describes the use of a plurality of blades located about the circumference of the tube to be severed. A wedging action about the circumference of the tube is used to hold it in place. U.S. Pat. No. 3,739,666 to Wright et al. issued Jan. 17, 1972 and entitled "Tube Cutting Head Structure" also describes a severing operation by cutting a tube about its circumference. In controllably positioning a cutting member relative to the tube, a weight and a counterweight are employed. Springs exert a yielding force against a cutter support opposing movement of the cutter support by centrifugal force. Movement of the cutter support by the springs is limited by engagement of ends of slots with studs. Additionally, an adjustable stop means is provided to limit movement of the cutter towards the axis of the tube, which adjustable stop means is in the form of a screw. In U.S. Pat. No. 4,633,695 to Klein issued Jan. 6, 1987 and entitled "Tool for Separation of Tubes," a machine is disclosed that separates tubes using deformation without cutting and then a subsequent cutting step is employed.

A number of devices have also been advanced for cutting a non-metallic piece while simultaneously applying tension to facilitate the cutting operation. U.S. Pat. No. 3,978,747 to Lyon issued Sep. 7, 1976 and entitled "Method and Apparatus for Severing Reinforced Elastomeric Tubular Particles" describes a cutting edge that enters a tube at one part of the tube's circumference and cuts straight through the tube without scoring the entire periphery of the tube while a mechanism pulls on the tube to create tension. In U.S. Pat. No. 4,567,795 to Pool issued Feb. 4, 1986 and entitled "Slot Cutting Apparatus," an apparatus is disclosed including a plurality of saw blades, each of which cuts a tube at one part of the tube's circumference. Tension is applied by pushing on the tube to be cut.

Despite numerous efforts to develop a satisfactory machine for severing tubes or pipes, it would be advantageous to provide an apparatus for efficiently severing a workpiece without creating burrs and without the need to subsequently ream the end of a severed workpiece so that the opening at the end is equivalent to the cylindrical bore or hollow portions within the workpiece.

SUMMARY OF THE INVENTION

In accordance with the present invention, an apparatus is provided for severing a workpiece, such as a pipe or tube made of metal, by simultaneous cutting and breaking operations, although the apparatus can be used with non-metallic workpieces that are not circular in cross-section. The apparatus includes a workpiece holding assembly comprising a collet member having a flared resilient end. A nylon insert member is disposed within the collet member. A bore of the insert member extends therethrough for receiving the workpiece to be severed. The flared end of the collet member releasably clamps about the insert member and the workpiece. The clamping engagement to hold the workpiece in place during the cutting operation is achieved using a cylinder/piston assembly of the workpiece holding assembly. The cylinder/piston assembly includes a collet closer piston that is connected to a cylindrical ram that extends substantially parallel to the collet member. When the collet closer piston is moved in a direction towards the flared end of the collet member, it causes the flared end to be compressed for firmly grasping the workpiece.

The apparatus further includes a cutting assembly that comprises a cutting disk or blade having a cutting edge that is rotatable about the workpiece whereby a circumferential scoring line or cutting path is created during operation of the cutting assembly. The cutting assembly includes a blade mounting assembly for supporting the cutting disk or blade. The blade mounting assembly includes a shaft that is connected to the cutting disk. At the end of the shaft adjacent to the cutting disk, a compressible member or rubber ring is located about the shaft to enable the cutting disk and shaft to move slightly in a direction relative to the length of the workpiece. This movement prevents the cutting disk from being held too ridgedly relative to the fixedly held workpiece when the cutting of the workpiece first begins. In the absence of such movement, the cutting disk and the workpiece would both be fixedly held thereby affording the cutting edge no amount of "give or play." This lack of movement would lead to an uneven or otherwise imperfect cut at the end of the workpiece that remains held to the collet member after the severing operation.

The cutting assembly also has two pairs of linear motion bearing blocks that connect the cutting assembly to a face plate. One pair of such bearing blocks is located on each side of the workpiece. Each of the bearing blocks has a bore through which a rod extends. The cutting assembly also includes a cutting weight. The cutting weight is connected to the bearing blocks, as well as the blade mounting assembly, by means of the two rods. The cutting weight is able to move along the rods using centrifugal force when the cutting assembly is rotating about the workpiece while severing the same.

The apparatus also includes a breaking assembly causing the workpiece to bend and eventually break whereby a workpiece portion of a desired length is severed from remaining workpiece portions that are held by the collet member. The breaking assembly is disposed on the side of the cutting assembly opposite that from the collet member. The breaking assembly includes a breaking weight that is located on the side of the workpiece opposite that of the cutting weight and is laterally displaced therefrom. The breaking weight, via centrifugal force, acts to apply a force to the workpiece. Attached to opposite sides of the breaking weight are first and second parallel arms. Each of these two arms is connected to a linkage mechanism. The breaking assembly also includes a roller assembly that is connected to the linkage mechanism at ends thereof opposite the ends that are connected to the first and second parallel arms. The roller assembly includes a pair of rollers having their cylindrical or long sides adjacent and parallel to each other and with workpiece portions in contact with the roller pair. During the severing operation, the breaking assembly rotates relative to the workpiece and, while doing so, provides tension to the workpiece whereby the workpiece always experiences compression at a point or area opposite the point or area of the workpiece that is currently being cut using the cutting disk. The linkage mechanism is used in ensuring that the breaking weight maintains a desired circumferential path about the workpiece during its entire revolution about the workpiece, i.e., a line from the workpiece adjacent the cutting disk to the top of the breaking weight is substantially perpendicular to the workpiece, rather than being at an angle that is not normal to the workpiece.

With respect to controlling the distance or amount that the cutting edge cuts through the workpiece, a cutter adjusting assembly is provided. The cutter adjusting assembly makes sure that the cutting edge enters or cuts through the workpiece only a predetermined amount or distance, which distance does not correspond to a complete cutting or separation of the workpiece using the cutting edge. Instead, the cutting edge stops a predetermined distance from cutting through the entire workpiece. Complete separation of the workpiece portions is accomplished using the breaking assembly. Similarly, in controlling the operation and the force applied by the rollers to the workpiece, a breaker adjusting assembly is provided. This adjusting assembly controls the outward radial distance that is followed by the breaking weight. Because this path in a radial direction from the workpiece is limited, the force supplied by the rollers is controlled to achieve suitable bending and ultimate breaking of the workpiece.

With respect to the severing operation, the cutting and breaking assemblies are caused to rotate relative to the fixedly held workpiece. During this rotation, the cutting edge of the cutting disk begins to score the periphery of the workpiece. The centrifugal force associated with the cutting weight is used to cause the cutting edge to move through the wall or thickness of the workpiece. Simultaneously, the breaking assembly rotates about the workpiece. The breaking weight, using centrifugal force, causes the rollers to apply a desired force to the workpiece. The rollers move about the periphery of the workpiece and remain on the same side of the workpiece as the cutting disk to provide suitable tension on one side of the workpiece while creating compression on the opposite side of the workpiece. In this manner, movement of the cutting edge through the workpiece is facilitated by avoiding or reducing jamming of the cutting disk between portions of the workpiece. When the cutting edge reaches a predetermined distance through the workpiece so that a predetermined amount of workpiece wall or thickness remains, the cutter adjusting assembly prevents further movement of the cutting disk through the workpiece. At this time, the cutting and breaking assemblies continue to rotate relative to the disk while the breaking assembly continues to apply a desired force to the portion of the workpiece about to be severed. The continued application of force, as well as the continued rotation, results in the ultimate severing or breaking of the workpiece portion that is located exteriorly of the workpiece holding assembly. The ultimate breaking of the workpiece using the breaking assembly results in uniform and acceptable severed workpieces without the need for further manufacturing steps, such as burr removal and/or reaming of the workpiece.

Based on the foregoing summary, a number of salient features of the present invention are readily discerned. A severing apparatus is provided that is able to cut different sizes and shapes of workpieces, particularly metal tubes or pipes, by simultaneously cutting around the entire outer surface of a workpiece while causing the workpiece to bend or break. The cutting assembly is stopped from cutting entirely through the workpiece so that the breaking assembly causes the ultimate severing of a workpiece portion whereby no burrs or deformed severed ends result. Consequently, no further machining or working of a severed workpiece is necessary in order to achieve a satisfactory severed workpiece. The apparatus includes an effective breaking assembly that is uniquely configured and appropriately disposed relative to a cutting assembly. In that regard, at each point along the circumferential score or cutting line, the breaking assembly causes the opposite point on the workpiece to be in compression thereby providing a desired tension and separation to permit the cutting disk to more easily cut through the workpiece material. In the case of a metal workpiece made of steel, there is sufficient elasticity in the steel to allow this to occur. The cutting assembly includes a compressible member that permits desirable, limited lateral shifting of the cutting disk when the cutting edge first begins to create a score line about the periphery of the workpiece. As a consequence, unwanted deformations of workpiece end portions held in the workpiece holding assembly are avoided.

Additional advantages of the present invention will become readily apparent from the following discussion, particularly when taken together with the accompanying drawings.

DETAILED DESCRIPTION

Figure 1:
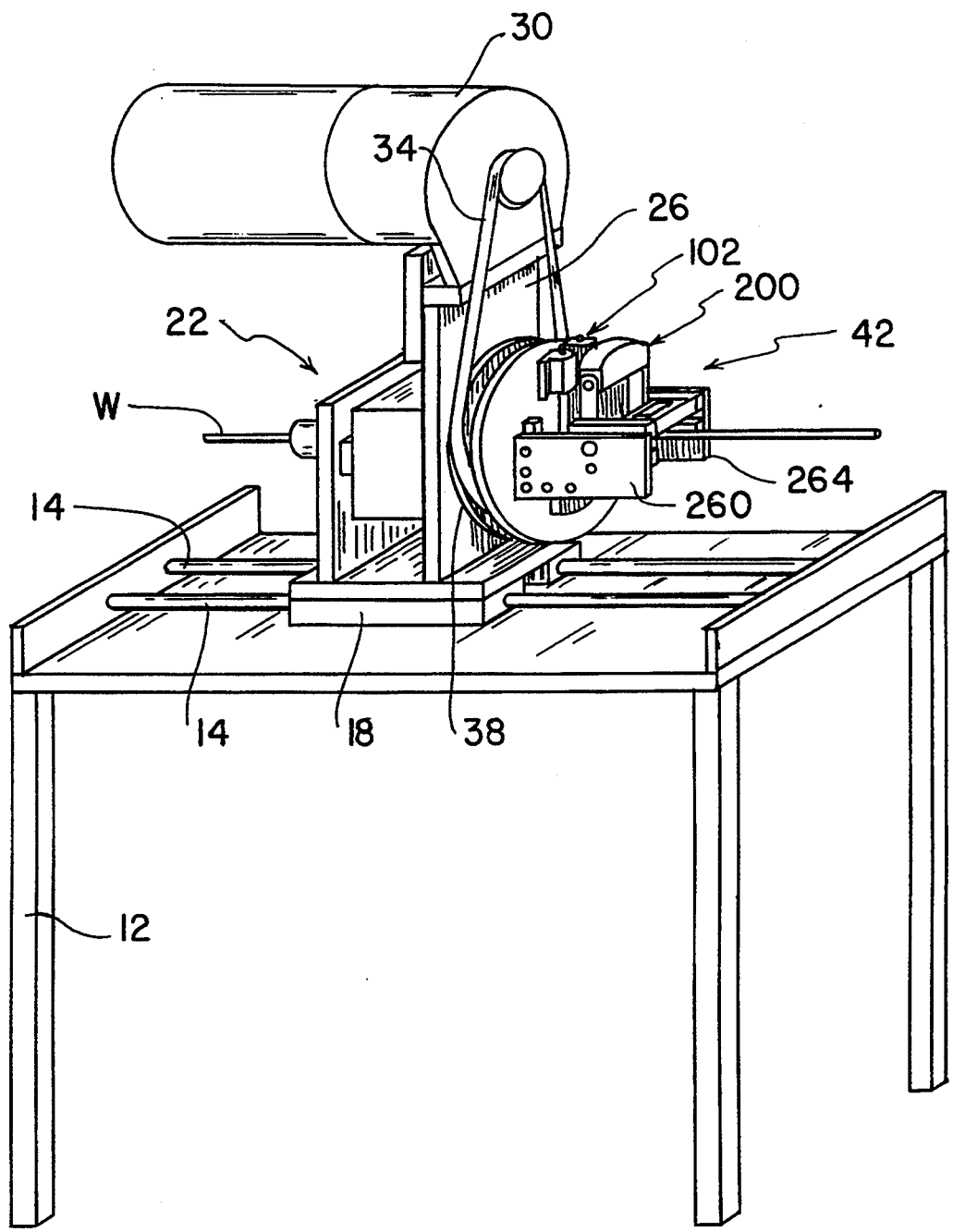
FIG. 1 is a perspective view of the apparatus of the present invention generally illustrating the assemblies for severing a workpiece.

With reference to FIG. 1, an apparatus is disclosed for severing a workpiece W that includes the novel assemblies and combinations thereof of the present invention. The apparatus disclosed in this embodiment includes a stand 12 that supports the apparatus parts used in severing the workpiece W. In the embodiment disclosed, mounting rods 14 connect to and extend along the length of the support stand 12. A baseplate 18 has bore holes through which the mounting rods 14 are disposed. Although not necessary, relative movement between the base plate 18 and the mounting rods 14 can be accomplished. The apparatus includes a holding assembly 22 for releasably clamping the workpiece W. The holding assembly 22 is connected to a motor mount 26. Located vertically above the motor mount 26 is a drive motor 30 that drives or causes a drive belt 34 to move and thereby rotate a driven pulley 38. The driven pulley 38 is connected to a severing device 42 that, as it rotates relative to the workpiece W, simultaneously cuts the workpiece W and applies a breaking force to the workpiece W.

Figure 2:
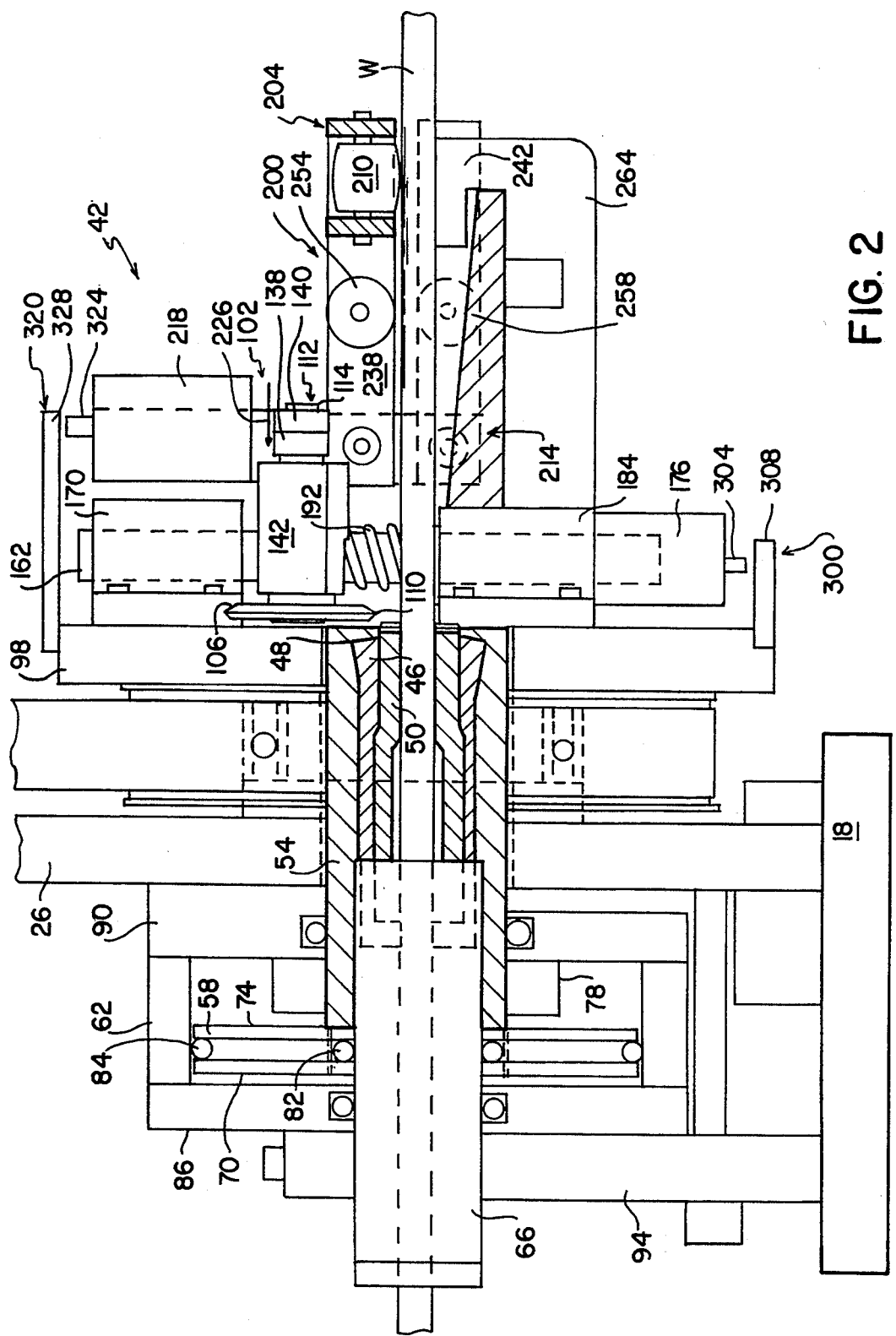
FIG. 2 is a longitudinal section illustrating portions of the holding, cutting and breaking assemblies of the present invention.

Referring now to FIG. 2, the assemblies of the present invention are next described. The holding assembly includes a collet member 46 that surrounds the workpiece W. The collet member 46 has flared end portions 48 that are movable radially inwardly towards the workpiece upon an application of force to the outer surface of such end portions 48. The collet member 46 includes a bore for receiving an insert member 50. The insert member surrounds and contacts portions of the workpiece W. The collet member 46 is preferably made of a metal material while the insert member 50 is preferably made of a non-metallic material, such as nylon, which does not scratch, dimple or otherwise create imperfections in the workpiece W when it is held by the insert member 50 using the clamping force applied by the collet member 46.

With regard to releasably clamping the workpiece W, surrounding or positioned outwardly of the collet member 46 is a collet holder or ram 54 that is movable relative to the collet member 46 in a direction along its length. The end of the collet holder 54, opposite the end for clamping the workpiece W, is connected to a collet closer piston 58 disposed in a collet closer cylinder 62. The collet closer piston 58 has a center hole for receiving a collet anchor 66 that is operatively connected to the collet member 46. In moving the ram 54 in order to fixedly hold or clamp the workpiece W, pressurized air is applied to a first side 70 of the closet closer piston 58 through a closer air inlet (not shown). The pressurized air causes the collet closer piston 58 and the ram 54 to move in a direction (a rightward direction with reference to FIG. 2) that causes the flared, resilient end portions 48 of the collet member 46 to be compressed inwardly by the force applied by the ram 54. To release the workpiece W, pressurized air is applied to a second side 74 of the collet closer piston 58 through a release air inlet (not shown). In connection with the length of ram 54 movement, a collet stroke limiter 78 is spaced from but located adjacent to the collet closer piston 58 to prevent movement thereof greater than a predetermined distance, with such predetermined distance dependent upon the suitable distance for the ram to move relative to the collet member 46 in order to properly clamp the workpiece W. To prevent unwanted escape of pressurized air using the hole in the collet closer piston 58, a piston/collet anchor sealing ring 82 is disposed in a sealing manner between the collet anchor 66 and the collet closer piston 58. Similarly, a cylinder/piston sealing ring 84 is disposed at the circumference or periphery of the collet closer piston 58 to make sure that the pressurized air only acts on the proper or selected face of the collet closer piston 58. The collet closer cylinder 62 is held and disposed between first and second collet closer plates 86, 90. A collet closer assembly that includes plates 86, 90, piston 58 and cylinder 62 is attached to the motor mount 26. As can also be seen in FIG. 2, a pulley hub 96 mounts onto the motor mount 26. The driven pulley 38 mounts on the pulley hub bearing and surrounds portions of the ram 54. A face plate 98 is mounted on one side of the driven pulley 38 and has a hole that receives end portions of ram 54, as well as collet member 46 and its end portions 48. The side of the face plate 98 at which the collet member 46 terminates is connected to the severing device 42.

Figure 3:
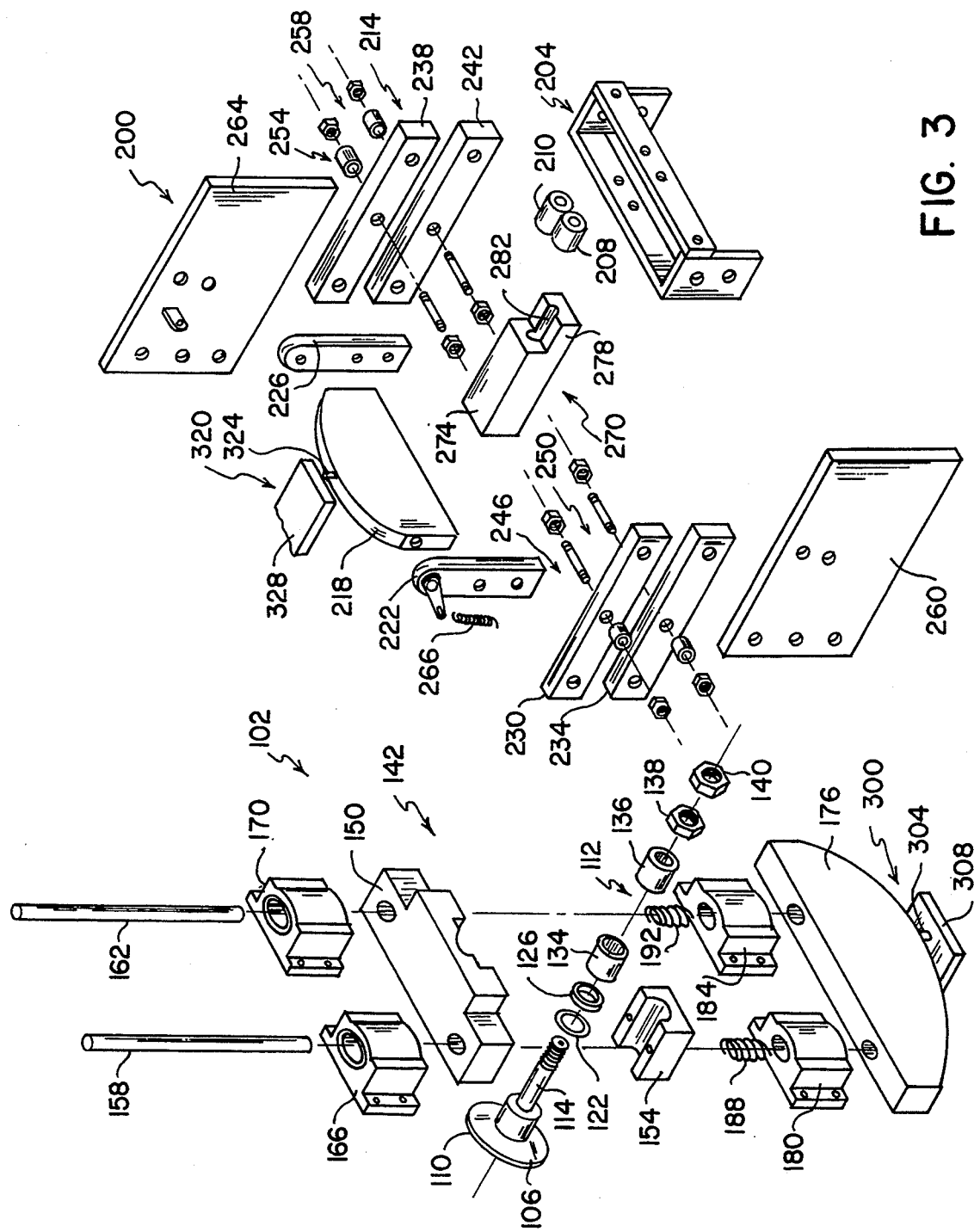
FIG. 3 is an exploded view illustrating parts of the cutting and breaking assemblies.
Figure 4:
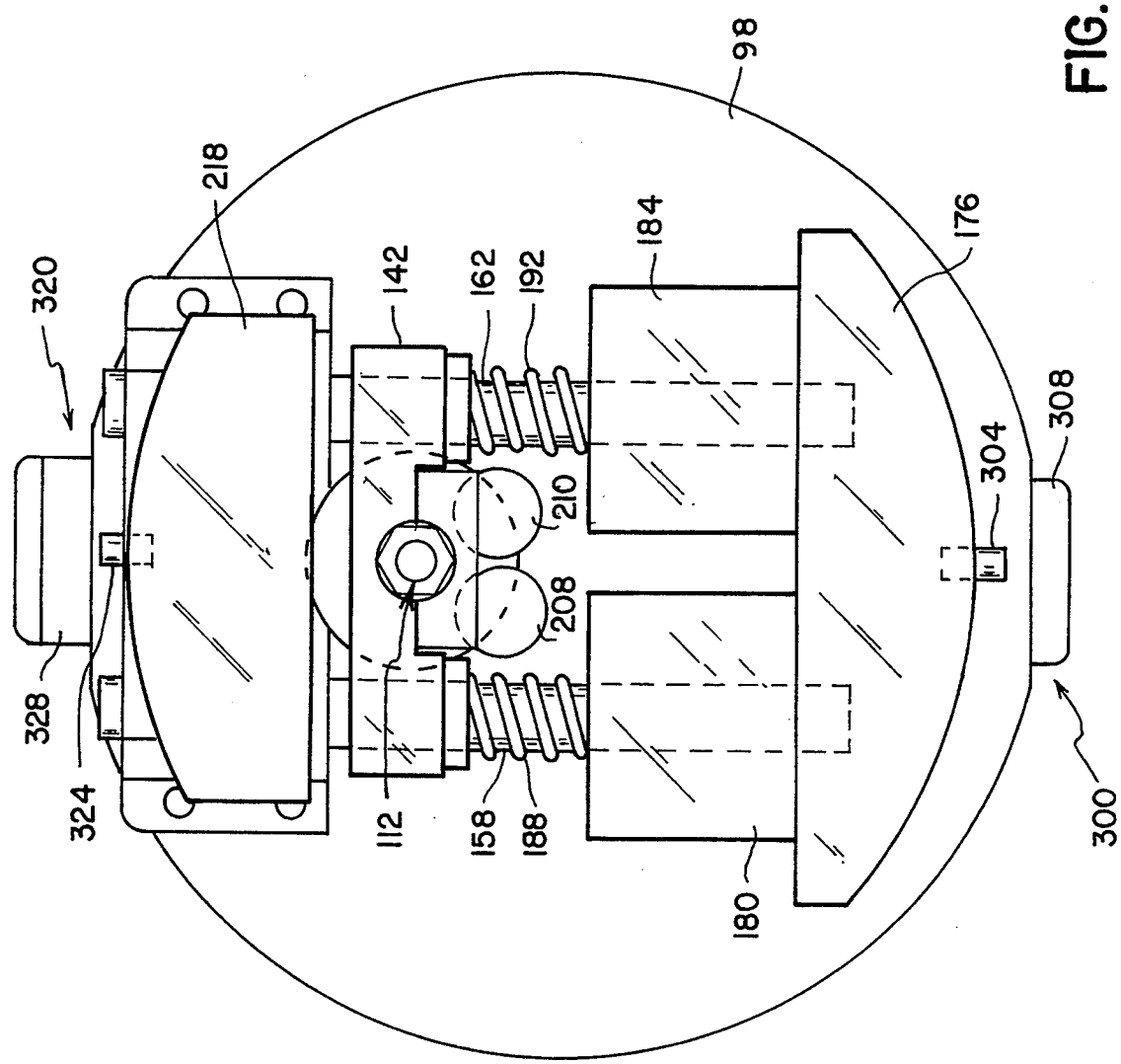
FIG. 4 is a frontal plan view illustrating parts of the cutting assembly and breaking assembly.
Figure 5:
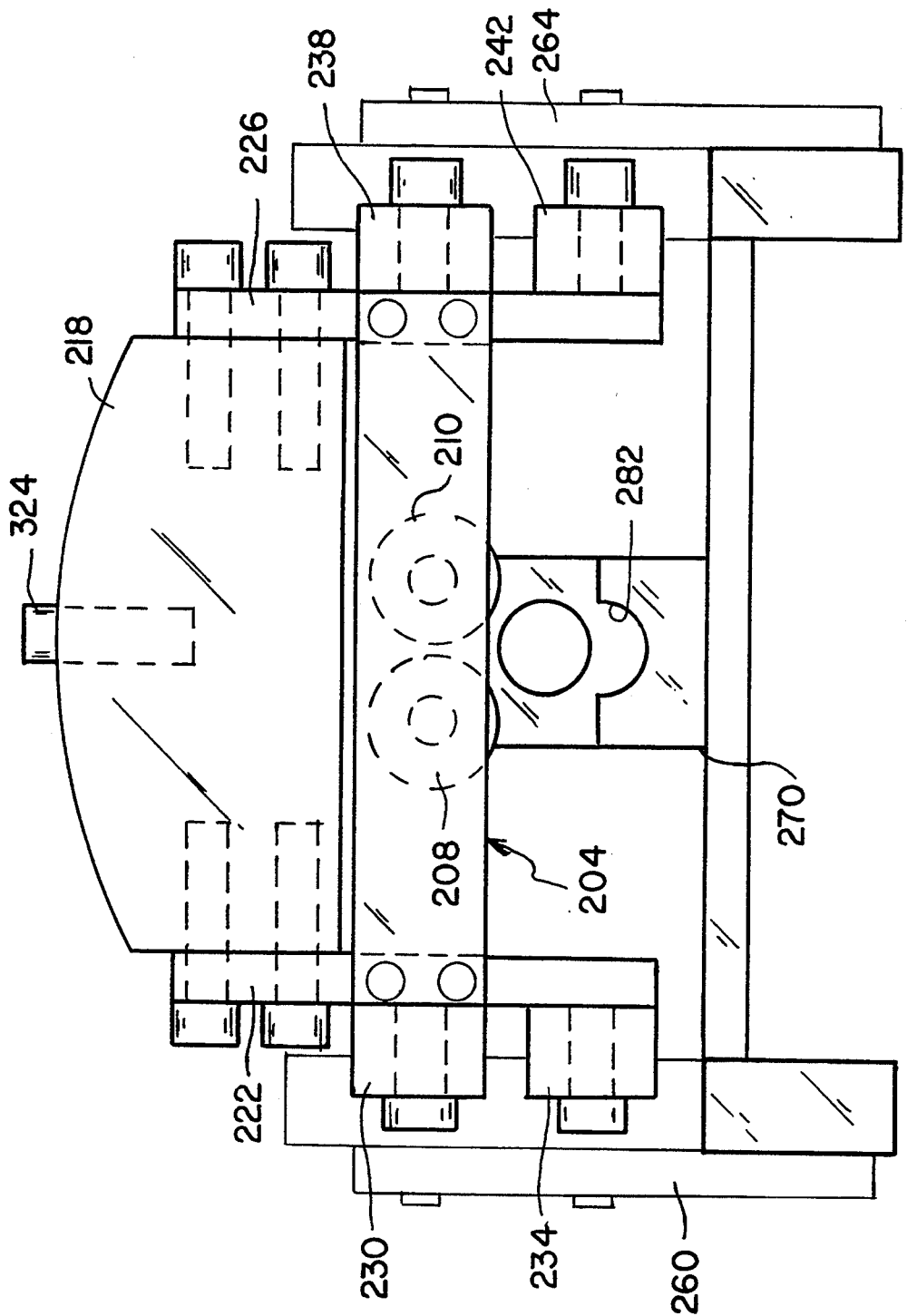
FIG. 5 is a frontal plan view illustrating the breaking assembly.

With further reference to FIG. 2, as well as FIGS. 3–4, a cutting assembly 102 of the severing device 42 for cutting through the thickness or wall of the workpiece W is next described. The cutting assembly 102 includes a cutting disk or blade 106 having a cutting edge 110. When caused to rotate relative to the workpiece W, the cutting edge 110 cuts through the periphery or the circumference of the workpiece W by creating a scoring line or cutting path about the periphery of the workpiece W through several rotations of the cutting disk 106 about the entire periphery of the workpiece W. The cutting edge 110 is preferably beveled and has a radius of about 0.0025 inch for cutting through the workpiece W. In one embodiment, the workpiece W is a tube or pipe having a diameter in the range of about 3/16–⅜ of an inch, although other sizes of workpieces can be cut using the present invention. Furthermore, the workpiece W need not be cylindrical or have a circular cross-section. Various cross-sectional geometries can be cut using the present invention, although it is preferred that the workpiece W be made substantially of a metal material. The cutting disk 106 is connected to a blade assembly 112 that includes a shaft 114. A compressible member 122 or elastomeric ring of the blade assembly 112 is positioned around the shaft 114 relatively adjacent to the cutting disk 106. The compressible member 122 is made of a resilient material having memory to permit a slight lateral movement of the cutting disk 106, together with the shaft 114, in a direction along the length of the workpiece W. That is, during the cutting operation when the cutting edge 110 initially begins to create a cutting path about the workpiece W, because of the beveled configuration of the cutting edge 110, a slight relative movement is required between the workpiece W and the cutting edge 110. Because the workpiece W is fixedly held in place, it is necessary that the cutting disk 106 be permitted to move laterally so that a straight and even cut is achieved through the workpiece W, particularly at the end of the portion of the workpiece W that is held by the holding assembly 22. In the absence of such initial lateral movement using a compressible member 122, the severed end of the workpiece portion held by the holding assembly 22 tends to be not smooth or some other unwanted deformity is created. Located adjacent to the compressible member 122 is another part of the blade assembly 112, namely a washer 126 that is also positioned about the shaft 114. The washer 126 acts as a wall or barrier to movement of the compressible member 122 so that the compressible member compresses or contracts, when desired, to permit the slight lateral shift of the cutting disk 110. A pair of bearing members 134, 136 are also part of the blade assembly 112 and are disposed about the shaft 114 adjacent the washer 126. The inside walls of the bearings 134, 136 have rollers extending along the lengths thereof that are in contact with the shaft 114. When the slight lateral movement occurs, the cutting disk 110 and shaft 114 move relative to the bearings 134, 136. A pair of fasteners 138, 140 are threaded to the opposite end of the shaft 114 and are used to hold the blade assembly 112 to a cutter mounting bracket 142 that comprises a first larger bracket member 150 and a second smaller bracket member 154. The mounting bracket 142 has a cavity that is shaped to receive and hold the cylindrical shaped bearings 134, 136, while the fasteners 138, 140 are positioned exteriorly but adjacent to the mounting bracket 142. The first bracket member 150 also includes holes for receiving first and second rods 158, 162. These rods 158, 162 extend in one direction through bores formed in linear motion bearing blocks 166, 170, respectively. These bearing blocks 166, 170 are connected to the face plate 98 and are spaced from the cutter mounting bracket 142. On the side of the cutter mounting bracket 142 opposite the bearing blocks 166, 170 is a cutting weight unit 176 having a predetermined weight. The cutting weight unit 176 is operatively connected to the cutting disk 106 by means of the rods 158, 162 that are located through holes formed in the cutting weight unit 176. Another pair of linear motion bearing blocks 180, 184 have openings for receiving the rods 158, 162, with these bearing blocks 180, 184 extending from a bottom side of the cutting weight unit 176. Also positioned between the cutter mounting bracket 142 and the cutter sleeves 180, 184 is a pair of springs 188, 192. The springs 188, 192 apply a force tending to cause the cutting weight unit 176 to move in a direction inwardly, pushing the cutting disk 106 radially away from the workpiece W. The cutting weight unit 176 is able to move relative to the rods 158, 162 during its rotation around the workpiece W during the severing operation.

With continued reference to FIGS. 1-3, reference is also made to FIG. 4 in describing the breaking assembly 200. The breaking assembly 200 is laterally disposed along the length of the workpiece W in a direction away from the cutting assembly 102 with portions thereof also connected to the face plate 98. The breaking assembly 200 includes a roller assembly 204 having a pair of rollers 208, 210 whose cylindrical lengths are parallel and adjacent to each other. The boundary or interface defined between them is used in contacting a portion of the workpiece W. A linkage mechanism 214 interconnects the roller assembly 204 including the rollers 208, 210 with a breaking weight unit 218. The breaking assembly 200 rotates and, by centrifugal force, the breaking weight unit 218 tends to remain radially outwardly relative to the workpiece W during its rotation. The force generated using the breaking weight unit 218 is applied through the linkage mechanism 214 to the roller assembly 204 and applies a force to the workpiece W at the point of contact with the rollers 208, 210, which force tends to flex or break the workpiece W as the cutting assembly 102 is cutting through the workpiece W.

The linkage mechanism 214 includes a pair of parallel arms 222, 226 which are connected to opposite sides of the breaking weight unit 218 and extend away from near the top of the breaking weight unit 218 in a direction towards the workpiece W. Each arm 222, 226 is connected to a pair of lateral legs. In particular, the arm 222 is connected to left upper leg 230 and left lower leg 234 and the arm 226 is connected to right upper leg 238 and right lower leg 242. Substantially at the center of the length of each of these legs 230-242 is a pivot assembly 246-258, respectively. Each of the two pairs of legs is connected to a bracket 260, 264 using connector members 266, 268 found at the centers of the legs 230-242. The ends of the legs 230-242 are not connected to the brackets 260, 264, but they are allowed to move relative to the arms 222, 226. One end of a spring 266 is connected to the bracket 260 and its opposite end is connected to the arm 222 for use in controlling movement of the breaking weight unit 218. During rotation of the breaking assembly 200, the lateral legs 230-242 pivot relative to the arms 222, 226 and brackets 260, 264 using their respective pivot assemblies 246-258 to create a pulling force on the roller assembly 204 causing the rollers 208, 210 to apply a force or tension to the workpiece W. The legs 230-242 are part of a parallelogram forming connector assembly that acts to maintain the breaking weight unit 218 along a desired arcuate or circular path about the workpiece W during the severing operation. That is, the breaking weight unit 218 does not deviate in a lateral direction along the length of the workpiece W. Instead, if a straight line were drawn perpendicular from the workpiece W to the top of the breaking weight unit 218 at each instance during its path about the workpiece W, the straight line would always be substantially perpendicular to the length of the workpiece W. This configuration provides a stable breaking assembly 200 without unwanted vibrations occurring during the rotation thereof. In the absence of pivotal pairs of lateral legs 230-242, such a desired rotation of the breaking weight unit 218 would not occur. Regarding the cutting weight unit 176 and the breaking weight unit 218, each of these units could comprise one or more separate interconnected pieces or members whereby adjustment of the weight of these weight units can be readily achieved to obtain the desired balance and lack of vibrations during rotation of their respective assemblies.

The breaking assembly 200 also includes a workpiece movement limiting or containing unit 270 that is disposed adjacent the workpiece W on the opposite side thereof from the rollers 208, 210. In one embodiment, the limiting unit 270 is held in place using support pieces connected to the brackets 260, 264. The limiting unit 270 includes a body 274 and a foot member 278 with a channel 282 formed through the limiting unit 270. Portions of the workpiece W extend through the channel 282. The limiting unit 270 acts to control the movement of the workpiece portion that is severed from the workpiece portion held by the holding assembly 22. That is, to prevent possible unwanted movement or travel of the severed workpiece portion, the channel 282, together with the foot member 278, control the movement of the severed workpiece portion.

With reference in particular to FIG. 4, a cutting adjusting assembly 300 is provided to control outward or radial movement of the cutting weight unit 176. The cutting adjusting assembly 300 includes a cutter adjusting member or movable screw 304 disposed in the top portion of the cutting weight unit 176 and which is movable by means of threading or unthreading the screw 304 relative to the cutting weight unit 176. The adjusting assembly 300 also includes a cutting weight stop 308 connected to the periphery or circumference of the face plate 98. The cutting weight stop 308 has a flat surface that is engagable with the outer end of the screw 304. The location of the end of the screw 304 relative to the breaking weight unit 176 controls the ultimate or final cutting position of the cutting edge 110 relative to the workpiece portion that is being cut. That is, at a predetermined position determined by engagement between the end of the screw 304 and the flat surface of the cutting weight stop 308, the cutting edge 110 does not cut further through the wall or thickness of the workpiece W. This amount of thickness of workpiece W remaining is preferably about 0.005 inch. If the workpiece W were cut so that more than 0.005 inch (with a tolerance of about 0.001 inch) of workpiece material or thickness still remained for breaking, a burr, deformation or other imperfection would be created during the subsequent breaking of the workpiece at the end of the severed workpiece portion held by the holding assembly 22. On the other hand, if less than 0.005 inch (with a tolerance of about 0.001 inch) of workpiece material or thickness remains after stopping the cutting, the breaking assembly 200 can cause an unwanted deformity or other imperfection in the portion of the workpiece that is severed adjacent the rollers 208, 210.

At the part of the face plate 98 opposite that of the cutter adjusting assembly 300, a breaker adjusting assembly 320 is provided for controlling outward radial movement of the breaking weight unit 218. The breaker adjusting assembly includes a breaker adjusting member 324 that is threadably positioned in the center portion of the top of the breaking weight unit 218. This member or screw 324 is movable relative to the breaker weight unit 218 in order to adjust and control outward movement of the breaking weight unit 218 relative to a breaking weight stop 328 that is fixedly connected to the face plate 98, diametrically opposite the cutting weight stop 308. During rotation of the breaking assembly 200 relative to the workpiece W, the engagement between the top of the breaking adjusting member 324 and a bottom flat surface of the breaking weight stop 328 prevent further outward radial movement of the breaking weight unit 218. The desired position of the breaking adjusting member or screw 324 relative to the breaking weight unit 218 is determined by observation and adjustment during operation. That is, its position is substantially controlled by factors such as achieving suitable breaking forces to properly apply tension to the workpiece W during the cutting operation in order to facilitate movement of the cutting edge 110 through the workpiece W.

Figure 6B:
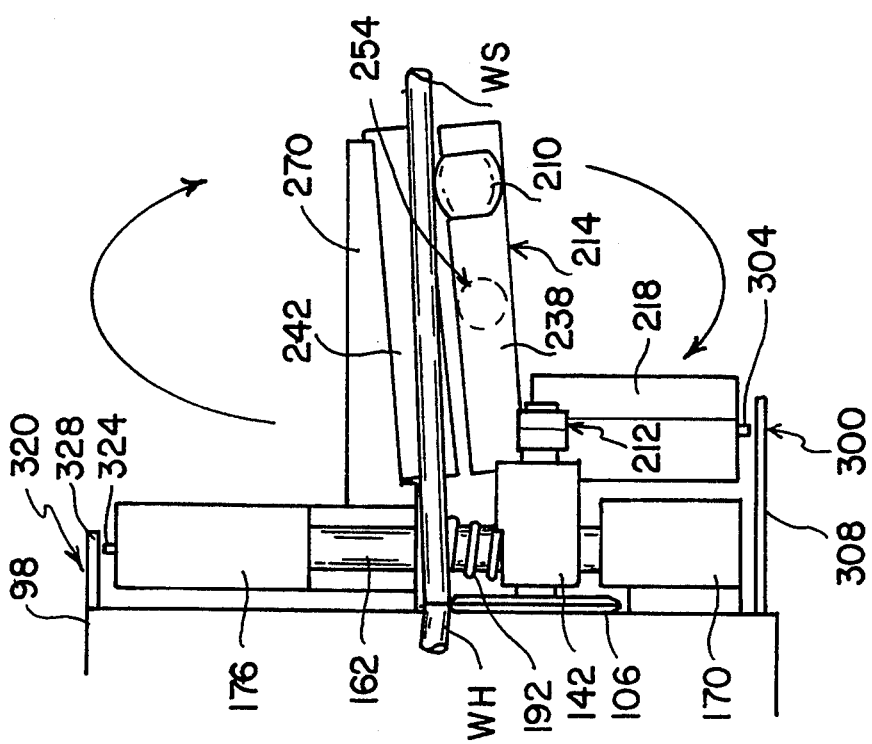
FIG. 6A–6C diagrammatically illustrate the cutting and breaking of a workpiece.
Figure 6A:
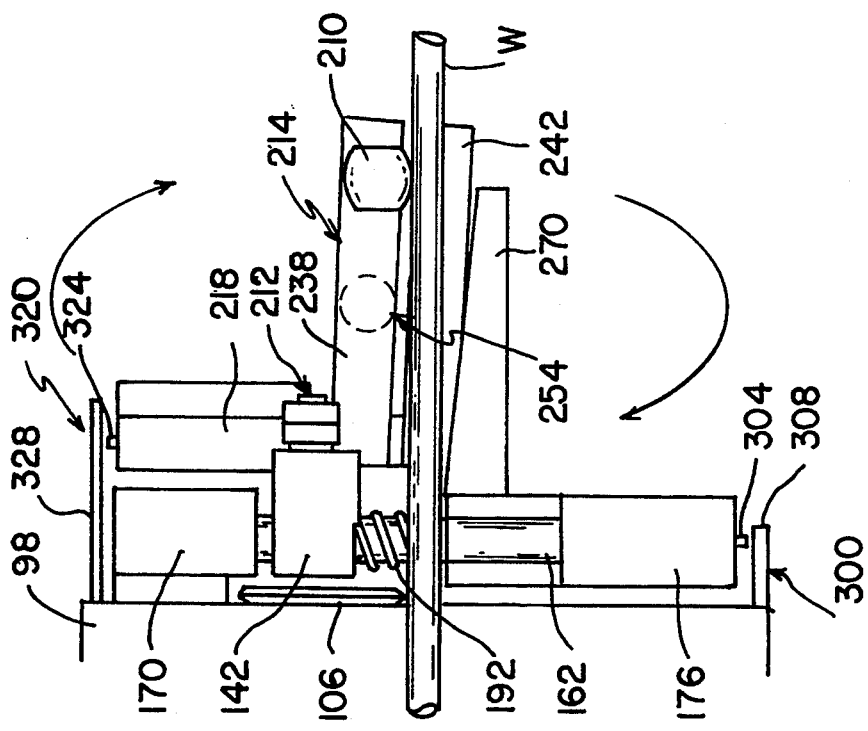
Figure 6C:
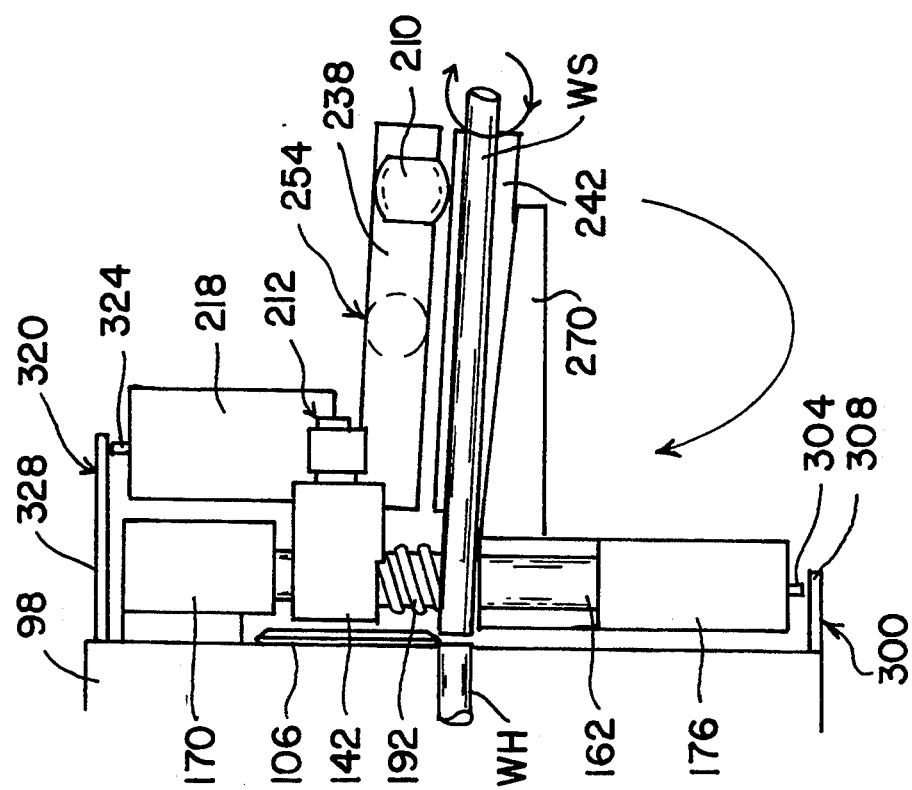

Referring now to FIGS. 6A–6C, the severing operation is described. As seen in FIG. 6A, the workpiece W is fixedly held at the face plate 98 using the holding assembly 22. When the drive motor 30 is powered on, the drive belt 34 causes the driven pulley 38 to rotate. This causes the face plate 98, together with the cutting assembly 102 and breaking assembly 200 to rotate as well because they are connected to the face plate 98. The cutting edge 110 of the cutting disk 106 begins to create a circumferential or peripheral score line about the workpiece W adjacent to the face plate 98. Because of the beveled configuration of the cutting edge 110, in order to avoid creation of a burr or other imperfection in the workpiece portion held by the holding assembly 22, the cutting disk 106 is able to move slightly in a lateral direction along the length of the workpiece W. This slight movement is accomplished using the resiliency of the compressible member 122 that compresses against the rigid washer 126 as the cutting disk 106 and its accompanying shaft 114 move slightly laterally away from the face plate 98 relative to the bearings 134, 136 that surround the shaft 114. After this initial slight lateral movement, due to the resiliency of the compressible member 122, the cutting disk 106, together with the shaft 114, shift slightly laterally back to their original starting position during the continuance of the cutting operation. The cutting assembly 102 continues to rotate about the workpiece W and the cutting edge 110 continues to cut along the same cutting path about the entire periphery of the workpiece W so that the cutting edge 110 cuts a portion of the entire periphery of the same cutting path during each revolution of the cutting assembly 102. The cutting edge 110 is allowed to move or cut through the workpiece W due to the centrifugal forces generated using the cutting weight unit 176 as the cutting edge 110 is caused to continue to cut through the workpiece wall or thickness. As illustrated in FIG. 6B, while the cutting assembly 102 is cutting through the workpiece W, the breaking assembly 200 is applying tension to the workpiece W using the force applied by the rollers 208, 210 while contacting the workpiece portion that is to be severed. In this manner, movement of the cutting edge 110 through the workpiece W is facilitated due to the tension that tends to spread apart workpiece portions adjacent to the cutting edge 110. Since the breaking assembly 200 is also rotating as the cutting edge 110 cuts about the workpiece W, it continually applies the desired tension, regardless of the rotational position of the cutting edge 110 relative to the workpiece W. Stated another way, during each revolution of the breaking assembly 200 relative to the workpiece W, the opposite point or area of the workpiece W that is currently being cut is in compression, whereas the workpiece portions, adjacent to where the cutting edge 110 is currently cutting, are in tension.

With reference to FIG. 6C, after the cutting edge 110 has cut through the workpiece W so that only about 0.005 inch of thickness remains, the cutter adjusting member 304 contacts the cutting weight stop 308 to prevent further movement of the cutting edge 110 through the workpiece W. At this time, the cutting assembly 102 and the breaking. assembly 200 continue to rotate about the workpiece W. During this time, the breaking assembly 200 continues to apply a breaking force to the workpiece portion to be severed whereby this portion oscillates farther away from the center axis of the workpiece portion being held by the holding assembly 22. After a number of revolutions subsequent to the stopping of the cutting, the workpiece severed portion WS is severed or breaks away from the held workpiece portion WH due to the force applied by the breaking assembly 200, as well as forces generated due to the oscillation of the severed workpiece portion SW. As the severed workpiece portion SW breaks away, it is contained by the workpiece limiting unit 270 that controls or guides the severed workpiece portion SW so that it does not travel, by virtue of the forces generated, outwardly in an unwanted direction away from the apparatus.

Based on the foregoing detailed description, a number of advantages of the present invention are readily seen. A workpiece, such as a pipe or tube, is severed without leaving any burrs, deformations or other imperfections. As a consequence, no further working of the severed workpiece is required, such as removal of burrs or reaming of the severed workpiece so that its bore is uniform throughout, including the end portions of the severed workpiece. Even though the cutting path is completely around the workpiece portion to be severed, the application of tension to the workpiece always remains the same relative to the cutting edge so that the movement of the cutting edge through the workpiece is greatly facilitated. Furthermore, the final position of the cutting edge relative to the severed workpiece is uniquely controlled so that, at a predetermined thickness of the workpiece, the cutting is discontinued while the breaking of the severed workpiece continues. As a result, unwanted deformations or other imperfections that could occur in the severed workpiece portion, as well as the held pipe portion, are avoided. The cutting disk and its shaft are advantageously arranged to permit slight lateral movement thereof when the cutting operation is started in order to prevent unwanted imperfections in the workpiece. Additionally, an effective but simplified holding assembly is provided for releasably holding a portion of the workpiece to be severed. A severed workpiece containment unit is also provided to control the travel of the severed workpiece portion.

The foregoing description of the invention has been presented for purposes of illustration and discussion. Further, the description is not intended to limit the invention to the form disclosed herein. Consequently, variations and modifications commensurate with the above teachings, within the skill and knowledge of the relevant art, are within the scope of the present invention. The embodiment described hereinabove is further intended to explain the best mode presently known of practicing the invention and to enable others skilled in the art to utilize the invention in such, or other embodiments, and with the various modifications required by their particular applications or uses of the invention. By way of example only, it should be understood that the cutting and breaking assemblies need not rotate relative to the workpiece. Rather, it is feasible that the workpiece move while the cutting and breaking assemblies remain stationary. This further, alternative embodiment also achieves the desired relative movement between the cutting and breaking assemblies and the workpiece to be severed. With respect to the inventions being claimed, it is intended that the appended claims be construed to include alternative embodiments to the extent permitted by the prior art.

What is claimed is:

1. An apparatus for severing a workpiece comprising:
   first means for engaging the workpiece having first and second portions with the second portion to be severed from the first portion, said first means fixedly holding the first portion stationary to prevent rotation of the first portion during the severing of the second portion from the first portion;
   second means for cutting the workpiece to sever the second portion from the first portion, said second means including a cutting edge that is located immediately adjacent to said first means with said second means rotating about the workpiece to form a cutting path using a centrifugal force generated by portions of said second means;
   third means for breaking the workpiece, said third means including means for pushing that applies a breaking force that is created by a centrifugal force, which is generated by one of: said portions of said second means and portions of said third means, during rotation of said means for pushing relative to the workpiece, while said second means is cutting the workpiece, said means for pushing only contacting the second portion of the workpiece and with the first portion of the workpiece being free of contact from said means for pushing; and
   fourth means for adjusting for use in controlling movement of said portions of at least one of said second and third means.

2. An apparatus, as claimed in claim 1, wherein:
said first means further includes drive means for causing said second and third means to rotate about said first means.

3. An apparatus, as claimed in claim 1, wherein:
said first means includes a collet member disposed around the first portion of the workpiece, said collet member having resilient end portions that are movable for use in clamping about the first portion of the workpiece.

4. An apparatus, as claimed in claim 3, wherein:
said first means includes an insert member positioned within said collet member, said insert member contacting the first portion of the workpiece when the first portion of the workpiece is held by said first means.

5. An apparatus, as claimed in claim 4, wherein:
said collet member is made of a different material than said insert member.

6. An apparatus, as claimed in claim 5, wherein:
said collet member is made substantially of metal and said insert member is made substantially of a nonmetallic material for avoiding creation of unwanted imperfections in the workpiece while said insert member is contacting the workpiece.

7. An apparatus, as claimed in claim 6, wherein:
said insert member is made substantially of a nylon material.

8. An apparatus, as claimed in claim 1, wherein:
said means for pushing only contacts the second portion of the workpiece at a distance from said second means substantially greater than the distance between said first and second means when the cutting path is formed.

9. An apparatus, as claimed in claim 1, wherein:
said first means includes movable means and said movable means includes piston means and fluid means for moving said piston means.

10. An apparatus, as claimed in claim 9, wherein:
said first means includes resilient portions and said piston means includes a ram disposed outwardly of at least portions of said first means to cause said resilient portions to move toward the workpiece when said ram is moved in a first predetermined direction.

11. An apparatus, as claimed in claim 9, wherein:
said movable means includes stop means for preventing movement of said piston means.

12. An apparatus, as claimed in claim 1, wherein:
said cutting edge has a beveled edge.

13. An apparatus, as claimed in claim 12, wherein:
said beveled edge has a radius of about 0.0025 inch.

14. An apparatus, as claimed in claim 1, wherein:
said second means includes a blade assembly and said cutting edge is part of a cutting disk with said blade assembly being connected to said cutting disk, said blade assembly including a shaft connected to said cutting disk and a compressible member operatively associated with said shaft, said compressible member being compressed during a portion of time when said second means is cutting the workpiece wherein said cutting disk is moved a short distance in a direction along a length of the workpiece.

15. An apparatus, as claimed in claim 1, wherein:
said portions of said second means includes a first weight member for use in generating said centrifugal force that is used to form the cutting path, said portions of said third means includes a second weight member for creating said centrifugal force used to generate said breaking force that is applied to the second portion of the workpiece, said first and second weight members being on opposing sides of the workpiece during formation of the cutting path.

16. An apparatus, as claimed in claim 15, wherein:
said second means includes at least a first rod with said first weight member being movable relative to said first rod.

17. An apparatus, as claimed in claim 16, wherein:
said second means includes at least a first spring and a first cutting sleeve disposed about said first rod.

18. An apparatus, as claimed in claim 15, wherein:
the workpiece has a length and said first weight member defines a plane and said cutting means rotates about the workpiece wherein said plane remains substantially perpendicular to the length of the workpiece during all rotations of said second means relative to the workpiece.

19. An apparatus, as claimed in claim 15, wherein said third means includes:
a roller assembly for contacting the second portion of the workpiece for use in applying said breaking force to the second portion of the workpiece; and
a linkage mechanism connected to said second weight member and said roller assembly, said linkage mechanism including at least a first leg member that is pivotal, said first leg member including first and second end portions with said roller assembly connected to said second end portions, wherein said second weight member rotates about the workpiece and said second end portions are caused to pivot in a direction away from said second weight member and said first portions are caused to pivot in a direction towards said second weight member using said centrifugal force due to rotation of said second weight member.

20. An apparatus, as claimed in claim 1, wherein:
said third means includes breaking weight means including at least a first breaking weight member and first and second parallel arms connected at opposite sides of said first breaking weight member.

21. An apparatus, as claimed in claim 20, wherein:
said third means further includes a linkage mechanism connected to each of said first and second arms, said linkage mechanism including a first pair of pivotal legs connected to said first arm and a second pair of pivotal legs connected to said second arm.

22. An apparatus, as claimed in claim 21, wherein:
said means for pushing includes a roller assembly connected to said linkage mechanism, said roller assembly including a pair of rollers in which said rollers overlie the workpiece and said rollers, together with said first breaking weight member, apply said breaking force to the workpiece.

23. An apparatus, as claimed in claim 1, wherein:
said third means includes a workpiece containing unit having a bore for receiving the workpiece, said workpiece containing unit including a body and a foot member with said foot member extending outwardly beyond said body and permitting oscillating movement of the workpiece when said third means is applying said breaking force to the workpiece.

24. An apparatus, as claimed in claim 1, wherein: said fourth means includes means for controlling said second means to prevent complete separation of the first portion of the workpiece held by said first means from the second portion of the workpiece extending outwardly from said first means, wherein said second means stops cutting the workpiece before said cutting edge is completely through the workpiece.

25. An apparatus, as claimed in claim 1, wherein said fourth means includes:
a first adjusting assembly for controlling a position of said cutting edge relative to the workpiece; and
a second adjusting assembly for controlling movement of said third means.

26. An apparatus, as claimed in claim 25, wherein:
said first adjusting assembly includes an adjustable member movable relative to a portion of said second means and a stop member for engaging said adjustable member.

27. A method for severing a workpiece, comprising:
holding a workpiece, using engaging means, that is to be severed into at least first and second portions, with the first portion extending away from said engaging means and the second portion being held stationary during the severing of the workpiece by said engaging means;
rotating a cutting means located immediately adjacent to said engaging means about the workpiece while the second portion remains stationary;
cutting the workpiece during said rotating step by use of centrifugal force created by first weight means operatively connected to said cutting means;
controlling movement of said cutting means during rotation thereof; and
breaking the second portion from the first portion while conducting said cutting step, said breaking step being performed using means for pushing in which said means for pushing only contacts the first portion of the workpiece while being free of contact from the second portion of the workpiece, said means for pushing causing said breaking using centrifugal force generated by second weight means during rotation of said means for pushing.

28. A method, as claimed in claim 27, wherein:
said cutting step includes permitting slight movement of said cutting edge in a direction along a length of the second portion of the workpiece when said cutting step initially starts.

29. A method, as claimed in claim 27, further including:
stopping said cutting edge from cutting completely through the workpiece.

30. A method, as claimed in claim 29, wherein:
said breaking step includes continuing said breaking step after said stopping step.

31. A method, as claimed in claim 30, wherein:

said stopping step includes stopping said cutting edge when about 0.005 inch of thickness of the workpiece remains.

32. A method, as claimed in claim 30, wherein:

said stopping step includes stopping said cutting step before a thickness of the workpiece is less than a thickness that causes an imperfection in the first portion of the workpiece due to said breaking step.

33. A method, as claimed in claim 32, wherein:

said cutting step includes cutting through a thickness of the workpiece wherein said thickness is less than a thickness that causes a deformation or burr in the second portion of the workpiece adjacent end portions thereof.

34. A method, as claimed in claim 27, wherein:

said centrifugal force generated during said breaking step is provided using said second weight means that is separate from said first weight means and said breaking step is performed with said second weight means being substantially opposite said first weight means relative to the workpiece.

35. A method, as claimed in claim 34, wherein:

said means for pushing includes at least a first leg member having first and second end portions and said breaking step includes using said centrifugal force generated using said second weight means to cause pivotal movement of said first end portion of said leg member in a direction towards said second weight means and said second end portion of said leg member in a direction away from said second weight means.

* * * * *